United States Patent
D'Ercoli et al.

(10) Patent No.: US 10,438,035 B2
(45) Date of Patent: Oct. 8, 2019

(54) SYSTEM AND METHOD FOR READING CODED INFORMATION

(71) Applicant: Datalogic IP Tech S.r.l., Lippo di Calderara di Reno (IT)

(72) Inventors: Francesco D'Ercoli, Bologna (IT); Marco Bassani, Bologna (IT); Claudio Saporetti, Bologna (IT); Marco Cumoli, Monte San Pietro (IT)

(73) Assignee: Datalogic IP Tech S.r.l., Lippo di Calderara di (IT)

( * ) Notice: Subject to any disclaimer, the term of this patent is extended or adjusted under 35 U.S.C. 154(b) by 0 days.

(21) Appl. No.: 15/764,985

(22) PCT Filed: Sep. 29, 2016

(86) PCT No.: PCT/IB2016/055836
§ 371 (c)(1),
(2) Date: Mar. 30, 2018

(87) PCT Pub. No.: WO2017/056035
PCT Pub. Date: Apr. 6, 2017

(65) Prior Publication Data
US 2018/0285611 A1    Oct. 4, 2018

(30) Foreign Application Priority Data
Sep. 30, 2015    (IT) .............. UB2015A04043

(51) Int. Cl.
*G06K 7/10*    (2006.01)
*G06K 9/00*    (2006.01)
(Continued)

(52) U.S. Cl.
CPC ..... *G06K 7/10722* (2013.01); *G06K 7/10861* (2013.01); *G06K 7/1413* (2013.01);
(Continued)

(58) Field of Classification Search
USPC ...................... 235/383, 385, 462.01, 462.14, 235/462.09–462.11
See application file for complete search history.

(56) References Cited

U.S. PATENT DOCUMENTS 6,072,496 A  *  6/2000  Guenter ............. G06K 9/00201
                                                                345/419
6,330,973 B1 * 12/2001  Bridgelall .......... G06K 7/10564
                                                                235/462.01
(Continued)

OTHER PUBLICATIONS

International Search Report and Written Opinion dated Jan. 5, 2017 in International Patent Application No. PCT/IB2016/055836, 11 pages.
(Continued)

*Primary Examiner* — Tuyen K Vo
(74) *Attorney, Agent, or Firm* — Shook, Hardy & Bacon, L.L.P.

(57) ABSTRACT

The invention relates to a method and a system for reading coded information from an object. The system comprises one or more three-dimensional cameras configured such as to capture three-dimensional images of the object and a processor configured such as to process the captured three-dimensional images. The processor is designed to: identify planes upon which faces of the object lie; extract two-dimensional images that lie on the identified planes; and apply coded information recognition algorithms to at least part of the extracted two-dimensional images.

20 Claims, 6 Drawing Sheets

(51) Int. Cl.
*H04N 13/204* (2018.01)
*G06K 7/14* (2006.01)
*G06K 9/32* (2006.01)
*G06K 9/62* (2006.01)
*H04N 5/247* (2006.01)

(52) U.S. Cl.
CPC ....... *G06K 7/1417* (2013.01); *G06K 9/00201* (2013.01); *G06K 9/3233* (2013.01); *G06K 9/6289* (2013.01); *H04N 5/247* (2013.01); *H04N 13/204* (2018.05); *G06K 2209/40* (2013.01)

(56) References Cited

U.S. PATENT DOCUMENTS

| | | | | |
|---|---|---|---|---|
| 8,496,173 | B2* | 7/2013 | Anselment | G06K 7/10712 235/440 |
| 10,094,650 | B2* | 10/2018 | Todeschini | G01B 11/00 |
| 2008/0310765 | A1* | 12/2008 | Reichenbach | G06K 7/10851 382/312 |
| 2011/0109748 | A1 | 5/2011 | Lee et al. | |
| 2013/0223673 | A1* | 8/2013 | Davis | G06K 9/78 382/100 |
| 2014/0029796 | A1 | 1/2014 | Fiorini et al. | |
| 2014/0034456 | A1* | 2/2014 | Gehring | B65G 43/08 198/810.01 |
| 2015/0310242 | A1* | 10/2015 | Wehrle | G06K 7/10732 235/470 |
| 2019/0026956 | A1* | 1/2019 | Gausebeck | G06T 19/20 |

OTHER PUBLICATIONS

International Preliminary Report on Patentability dated Apr. 12, 2018 in International Patent Application No. PCT/IB2016/055836, 7 pages.

\* cited by examiner

SYSTEM AND METHOD FOR READING CODED INFORMATION

CROSS-REFERENCE TO RELATED APPLICATIONS

This application claims priority to International Application No. PCT/IB2016/055836, filed Sep. 29, 2016, which claims priority to Italian Patent Application No. UB2015A004043, filed Sep. 30, 2015, which are incorporated in their entirety by reference herein.

BACKGROUND OF THE INVENTION

The present invention concerns a system and a method for reading coded information.

Specifically, the present invention concerns a system and a method for reading coded information from an object.

The term "coded information" is used to indicate the set of identification data contained within a code, preferably an optical code. The term "optical code" is meant to indicate any graphical representation that has the function of storing said coded information. The term "optical code" comprise graphical representations detectable both in the visible light field and in the range of wavelengths between infrared and ultraviolet.

Particular examples of an optical code consist in linear or two-dimensional codes, in which information is encoded by using appropriate combinations of fixed shape elements, for example square, rectangular or hexagonal, of a dark color (usually black) separated by light elements (spaces, usually white), such as bar codes, stacked codes and two-dimensional codes in general, color codes, etc. The expression "optical code" also comprises, more generally, other graphical forms with an information coding function, including clearly printed characters (letters, numbers, etc.) and special patterns ("pattern") (such as stamps, logos, signatures, fingerprints, etc.).

The coded information can relate, for example, to distance, volume, size, and/or identifying data of an object.

In transport and logistics commonly used systems are those of transport and the sorting of parcels, bags and more generally objects. With these systems, the objects are placed on a moving conveyor belt and identified on the basis of reading an optical code printed on a label associated with each object. Reading the optical code is performed automatically by means of a special automated coded information reading system.

As described by EP2681138, in the past, when there were only linear codes, optical code reading was performed by means of scanning an optical code using a beam of laser light emitted from a laser reader. With the advent of two-dimensional codes, the use of digital cameras has spread, typically utilizing CCD/CMOS sensors. These cameras allow greater flexibility of use; they are in fact able to read traditional linear codes two-dimensional codes and other types of codes, as well as offering additional features such as OCR (optical character recognition).

The Applicant has observed that the digital cameras used in these systems are two-dimensional (2D) cameras. The use of 2D cameras is however affected by problems of perspective distortion of the image due to the fact that a 2D system is being used to capture an object that in reality, is three-dimensional (3D). The elimination of this distortion from the captured 2D images requires the use of complex correction algorithms.

In addition, to ensure the identification of coded information that may be present on a face of any object, these systems require the use of multiple 2D cameras. The Applicant has, however, observed that, in order to ensure the detection of an optical code in every possible situation, it is necessary to over-specify the number of cameras in such a way as to ensure that there is at least one camera that can capture all of the optical code in its entirety, even in the most unfavorable of cases (namely, an optical code located near the camera and/or an optical code of maximum dimensions). In addition, in the case of objects that are very close to one another along the direction of travel of the conveyor belt and/or along a direction that is perpendicular to it, there is the problem of distinguishing those objects in order to make a correct association between the optical code and a respective object. As is evident from EP2681138, avoiding this problem requires the use of additional equipment and/or complicated algorithms and often results in decreased guaranteed reading performance due to the intrinsic limitations of the solution implemented (it requires the customer to keep objects spaced far apart, to reduce the speed of movement, to reduce the maximum dimensions and/or to increase the minimum dimensions of the objects being processed, etc).

The Applicant has therefore raised the technical problem of providing a system and an improved method for reading coded information compared to those of the prior art.

In particular, the Applicant has raised the technical problem of providing a system and a method for reading coded information that allows the above mentioned problems relating to the perspective distortion of the image, the over-specifying of the cameras and the distinguishing of objects that are very close to one another to be eliminated, both along the direction of travel of the conveyor belt and along a direction perpendicular to it.

The Applicant has found that this technical problem can be solved through the use of one or more three-dimensional cameras, designed to capture three-dimensional images of the object, and appropriate processing of the captured three-dimensional images that is designed to generate two-dimensional images of the object upon which to implement coded information recognition algorithms; the processing of the images comprising an operation of identifying planes upon which faces of the object lie (namely, faces that delimit the volume of the object) and an operation for extracting two-dimensional images that lie on the identified planes.

The Applicant has, in fact, perceived that obtaining two-dimensional images of the object from three-dimensional images allows two-dimensional images to be obtained that already lack any perspective distortion. Also, given that the three-dimensional images already carry information regarding the volume of the object, it is possible, thanks to the operation of identifying planes upon which faces of the object lie, to distinguish—from the beginning—one object from another, being ensured that the two-dimensional images that are obtained from said processing of the 3D images relate to one and only one object (and therefore only contain coded information belonging to that object). In other words, the problem of having to correctly associate an optical code with each object is eliminated at source. The two-dimensional images obtained using the methodology of the invention are thus already representative of the faces of interest of an object without redundancy and without perspective distortion. This represents notable technical progress with respect to the prior art described above.

Furthermore, with the use of three-dimensional cameras, it is no longer necessary to over specify the number of cameras as described above. In fact, in cases where the coded information can be located on any face of an object, overlapping is only required in order to guarantee capturing—with the plurality of three-dimensional cameras—the entire volume of the object, without discontinuity, and it is no longer linked to the characteristics of the application: minimum and maximum dimensions of the objects and optical codes that must be recognized. Furthermore, in applications where the presence of coded information is limited to a predetermined subset of faces of an object (for example, 1, 2 or 3 predetermined faces), it may be sufficient to use a single three-dimensional camera.

What is more, it is possible to obtain information regarding the shape and/or volume of an object, without requiring additional equipment (such as a volume sensor).

Finally, given that the coded information recognition algorithms are performed with two-dimensional images, algorithms that are well-known in the art can advantageously be used, acting upon two-dimensional images.

BRIEF SUMMARY OF THE INVENTION

In a first aspect, the invention therefore relates to a system for reading coded information from an object, comprising:
a three-dimensional camera configured in such a way as to capture three-dimensional images of the object;
a processor configured to process each three-dimensional image captured by the three-dimensional camera in order to:
identify planes upon which faces of the object lie;
extract two-dimensional images that lie on the identified planes;
apply coded information recognition algorithms to at least part of the extracted two-dimensional images.

In a second aspect thereof, the invention relates to a method for reading coded information from an object, comprising the following steps:
capturing, by means of a three-dimensional camera, three-dimensional images of the object;
processing every three-dimensional image captured by mean of the following steps:
identifying planes upon which faces of the object lie;
extracting two-dimensional images that lie on the identified planes;
apply coded information recognition algorithms to at least part of the extracted two-dimensional images.

The present invention in at least one of the above aspects can present at least one of the preferred characteristics that follow.

DETAILED DESCRIPTION OF THE INVENTION

Figure 1:
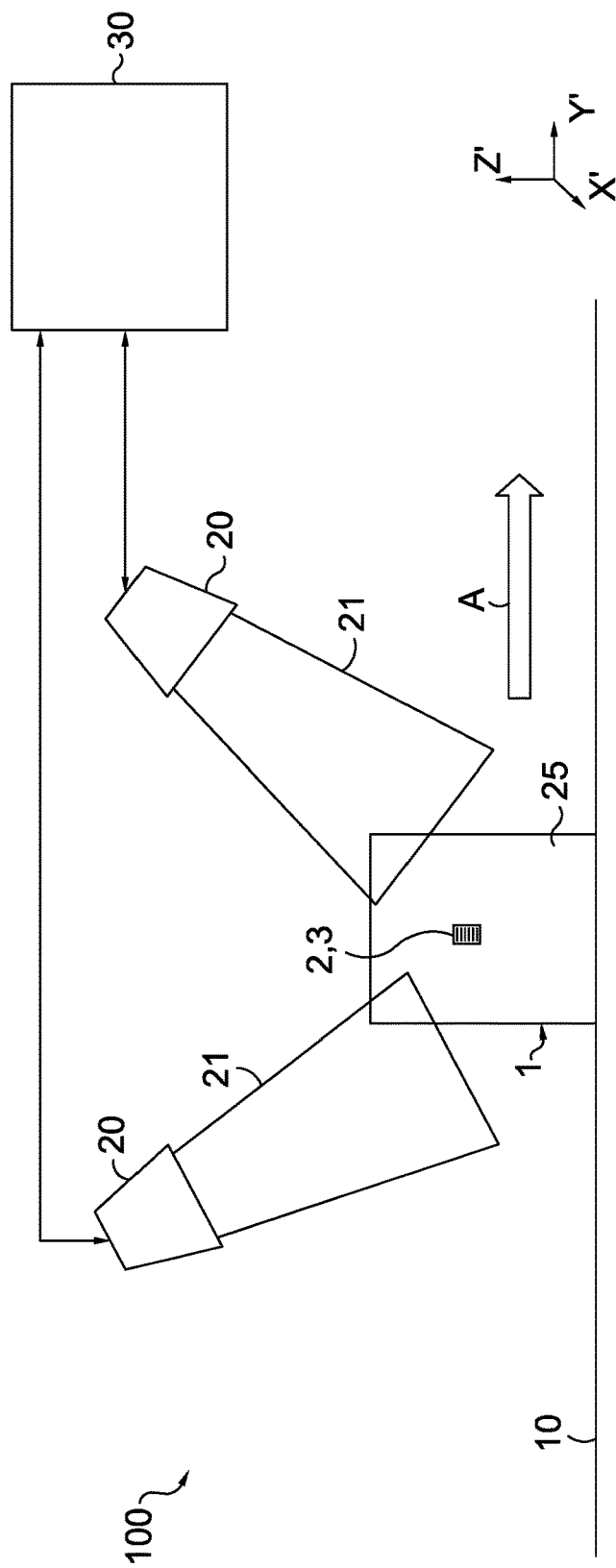
FIG. 1 is a schematic view of a coded information reading system according to one embodiment of the present invention.

In one embodiment, the processor is configured to apply the coded information recognition algorithms separately to each of said at least part of the extracted two-dimensional images.

In one embodiment, the processor is configured to apply the coded information recognition algorithms to all of the extracted two-dimensional images.

In a preferred embodiment, the processor is configured to merge said at least part of the (preferably all) extracted two-dimensional images into a single combined two-dimensional image, comprising the flattening of said at least part of the (preferably all) extracted two-dimensional images. Preferably, the processor is configured to apply the coded information recognition algorithms to said combined two-dimensional images. This advantageously allows said algorithms to be applied only once, to a single image. In comparison to known solutions that involve the use of a plurality of two-dimensional cameras, each with its own processor for applying the recognition algorithms to the images captured by the respective cameras, as well as the use of techniques for subsequently combining, in a timely manner, the results obtained from each processing unit, this solution can significantly reduce the computational load.

Preferably, the processor is configured in such a way as to apply the coded information recognition algorithms only to two-dimensional images (or portions thereof) that—amongst the extracted two-dimensional images—contain coded information. This advantageously allows the computational load to be reduced. Said at least part of the extracted two-dimensional images to which the recognition algorithms are applied are therefore, preferably, the two-dimensional images that, amongst those extracted, contain coded information.

The identification of the planes upon which faces of the object lie can be performed by means of algorithms capable of applying appropriate geometrical correlations to points within a cloud of three-dimensional points representing the three-dimensional image captured by the camera or to points of a 2D depth image created from such a three-dimensional image.

Preferably, the processor is configured in such a way as to extract said two-dimensional images by identifying the points that lie on the identified planes. For example, these points can be identified from a cloud of three-dimensional points representing the three-dimensional image captured by the camera or by a pair of 2D images, consisting of a 2D brightness image and a 2D depth image, created from said three-dimensional image.

It is observed that brightness image means a 2D image that is defined, in an X, Y plane of a three-dimensional camera reference system, by a set of brightness (or intensity) values associated with the points (or voxels) of the three-dimensional image. In turn, depth image or depth map means an image or 2D map defined, in said X, Y plane, by a set of distance values associated with the points (or voxels) of the three-dimensional image with respect to a predefined point of view.

Preferably, the processor is configured to process each three-dimensional image captured by said three-dimensional camera in order to identify any regions of interest of the object (for example, a region comprising at least part of coded information, namely an optical code).

Preferably, the identification of the planes upon which faces of the object lie is performed only for the plane/planes upon which lie/lies the region/regions of interest identified and or portions of said plane/planes upon which lie/lies the identified region/regions of interest.

Preferably, the system comprises a plurality of three-dimensional cameras configured to capture three-dimensional images of the object from different directions.

Preferably, the processor is designed to merge the images captured by the plurality of three-dimensional cameras in order to obtain a single merged three-dimensional image representing the object in its entirety.

Preferably, the extraction of two-dimensional images is performed from said single merged three-dimensional image.

Preferably, in the case of a plurality of three-dimensional cameras, the processor is configured to perform the detection of said potential regions of interest by individually processing the three-dimensional images captured by the plurality of three-dimensional cameras and/or the single merged three-dimensional image.

In one embodiment, the three-dimensional images captured by the plurality of cameras are represented by respective three-dimensional point clouds (i.e. voxels).

Preferably, the processor is configured to perform the merging by:
representing the point clouds through respective stacks of parallel planes ("plane-stack"), stacked in a predetermined direction;
identifying planes shared by stacks of planes;
performing a data merging algorithm on the point cloud points that belong to the identified shared planes.

In an alternative embodiment, the processor is configured to perform the merging by operating on a plurality of pairs of two 2D images, one 2D brightness image and one 2D depth image, respectively representing three-dimensional images captured by the plurality of cameras. Preferably, the processor is configured to perform the merging by:
identifying in the 2D depth images, representing the three-dimensional images captured by the plurality of cameras, the points having, in the X, Y plane, the same distance value; and
performing a data merging algorithm on the points thus identified.

Preferably, the data merging algorithm is designed to generate, for each identified point, a given datum (for example, a unique value of voxel intensity) from multiple data associated with each of said points within the various point clouds or within the various 2D brightness images representing the captured three-dimensional images.

Preferably, when the plurality of three-dimensional cameras comprises more than two cameras, the merging is performed using pairs of three-dimensional images. For example, in the case of three cameras, it can be expected to firstly perform the merging of two three-dimensional images captured by a first pair of cameras and then of the merged image thus obtained and the three-dimensional image captured by the third camera.

In the case of a plurality of cameras, the identification of the planes upon which faces of the object lie can be performed individually on the three-dimensional images captured by the plurality of three-dimensional cameras and/or on the single merged three-dimensional image.

The processor can be configured to firstly perform the merging and then the identification of the planes or, vice versa, first the identification of the planes and then the merging, or to perform the two stages substantially simultaneously.

In particular, the steps of merging the three-dimensional images and identifying the planes can be performed as two separate steps, one after the other. For example, it can be expected to firstly perform the merging and, successively, to perform the step of identifying the planes from the single merged three-dimensional image. Alternatively, the step of identifying the planes can be performed on the three-dimensional images captured by the cameras, before performing the merging step such as to direct the merging itself. For example, this can be used to guide the selection of the direction to be used for stacking planes during the merging process. This direction may, for example, be selected in such a way as to be perpendicular to one face of the object (so as to have the group of planes parallel to such a face of the object).

In another embodiment, the two steps can be carried out with a degree of overlap and interdependence.

Preferably, the identification of planes upon which the faces of the object lie is limited to portions of said planes that correspond to said faces of the object. This advantageously allows for a reduction in the time taken to execute the coded information recognition algorithms and to reduce the memory space required for storing the extracted two-dimensional images.

The identification of the planes may be limited to a face or to a subset of the faces of the object or can be extended to all of the faces. For example, the extraction of the planes can be limited to only those faces of the object that are flat (in the case of the object not having all faces equivalent to substantially flat faces) and/or—as mentioned above—to those faces upon which there is a region of interest of the object (for example, a region comprising coded information, namely an optical code).

The extension of the steps of identifying the planes to all of the faces of the object can be advantageous for providing at the output information regarding the object in its entirety, useful—for example—in verifying the integrity of all of the faces of the package, including those faces without coded information to be read, and/or for extracting volume information.

The identification of the planes can be performed using algorithms capable of applying appropriate geometrical correlations to the points of a three-dimensional point cloud that represents said merged three-dimensional image or to points of a 2D depth image obtained from the merged three-dimensional image.

Preferably, the processor is configured to extract said two-dimensional images by identifying, for example, from a three-dimensional point cloud representing said three-dimensional merged image or from a pair of 2D brightness images and 2D depth images obtained from the merged three-dimensional image, the points that lie on the identified planes.

Preferably (for example when the identification of planes is not limited only to those portions of said planes that correspond to the faces of the object), the extraction of the two-dimensional images is limited to a portion of the image that corresponds to said faces of the object. This advantageously allows for a reduction in the time taken to execute the recognition of coded information algorithms and a reduction in the memory space required for storing two-dimensional images.

In one embodiment, all or some two-dimensional images extracted from said merged three-dimensional image are provided at the output of the coded information reading system as separate images.

In one embodiment, all or some two-dimensional images extracted from said merged three-dimensional image are provided at the output of the coded information reading system as a single combined two-dimensional image, comprising the flattening of said extracted two-dimensional images.

Plurality of cameras means two or more cameras.

The three-dimensional camera/s use/s range imaging type technology.

The term "range imaging" refers to a technology used by a three-dimensional camera designed to provide, for each point (or voxel) of an image, information regarding the position of the voxel in space (in any coordinate system, for example, Cartesian, polar, or any hybrid representation), together with information regarding the intensity of the voxel (for example, provided as levels of gray or color). For example, each voxel can be associated with a pair of two-dimensional Cartesian coordinates X, Y, a value indicating the intensity of the voxel (for example, provided as levels of gray or color) and a value indicating the distance of the voxel from a predetermined point, or else a triplet of three-dimensional Cartesian coordinates X, Y, Z and a value indicating the intensity of the voxel.

Preferably, the three-dimensional camera/s is/are selected from the group consisting of stereo cameras, TOF cameras (where TOF is an acronym meaning "time-of-flight"), structured light cameras and plenoptic cameras (or light-field cameras).

The three-dimensional camera/s is/are configured in such a way as so capture three-dimensional images of the object within a predetermined measurement volume. In the case of several cameras, said predetermined measurement volume is preferably defined within the reading system by the set of detection volumes of each camera.

Preferably, the measurement volume is dimensioned in such a way as to guarantee the detection of objects of predetermined minimum and maximum dimensions.

In the case of a plurality of cameras, the three-dimensional cameras are preferably arranged in such a way as to guarantee the capture of the entire volume of the object within said predetermined measurement volume.

The number of three-dimensional cameras is preferably selected such as to guarantee the capture of the entire volume of the object within said predetermined measurement volume.

The three-dimensional cameras are preferably configured (for example, in terms of field of view and depth of field) such as to guarantee the capture of the entire volume of the object within said predetermined measurement volume.

In the case of a plurality of cameras, the three-dimensional cameras are preferably configured such as to guarantee a certain overlapping of the three-dimensional images captured. This advantageously allows for the generation of said merged three-dimensional image, representing the object in its entirety, without discontinuity.

Preferably, the processor is configured such as to process the three-dimensional images captured with the same timing by the plurality of three-dimensional cameras. To this end, the reading system preferably comprises a synchronization system, designed to synchronize the capture timing of the various three-dimensional cameras.

Preferably, said coded information recognition algorithms are algorithms designed to operate on two-dimensional images.

The object preferably has a shape that comprises substantially flat faces. More preferably, the object has a shape wherein all of the faces are substantially flat or equivalent to substantially flat faces. For example, the object can have substantially the shape of a cube or parallelepiped.

Preferably, the object is moving with respect to the camera(s). Preferably, the system comprises a conveyor belt system for transporting the object.

Preferably, the camera's is/are fixed with respect to the conveyor belt.

Preferably, in the case of a plurality of cameras, it is expected to perform a calibration procedure (preferably during the installation of the reading system) that is designed to guarantee a common reference system for the cameras.

Preferably, it is expected to perform a calibration procedure (preferably during the installation of the reading system) that is designed to allow for the mapping of the coordinates of a point of an image from the reference system of said cameras to a reference system (for example 3D Cartesian) of the reading system (defined, for example, by a direction Y' that is parallel to a feed direction A of the conveyor belt, by a direction X' that is perpendicular—in the plane of the conveyor belt—to the direction Y' and by a direction Z' that is perpendicular to the plane of the conveyor belt).

FIG. 1 shows a coded information 2 reading system 100 according to one embodiment of the invention.

The system 100 is an automated system capable of automatically reading coded information 2 present upon objects 1.

The system 100 can be part of an object 1 transport and handling system (for example, packages and/or luggage).

The system 100 comprises a conveyor belt 10 that moves the objects 1 in a feed direction A with respect to a plurality of cameras 20. For simplicity of illustration, in FIG. 1 only one object 1 and two cameras 20 are shown.

Each object 1 has on at least one of its faces 25 at least one optical code 3. The optical code 3 can be positioned on any one or more faces 25 (preferably except the lower one) of the object 1.

In order to capture an optical code 3 on a lower face 25, the system 100 may also comprise a 2D camera, not shown (or preferably a linear camera), positioned beneath the conveyor belt 10. The lower face does not require capturing of a distance (and, therefore, using a 3D camera) insofar as it is taken for granted that this distance is fixed, equal to that of the plane of the conveyor belt 10.

FIG. 1 shows a Cartesian coordinate system X', Y', Z' of the reading system 100, where Y' represents a direction parallel to the feed direction A of the conveyor belt 10, X' a perpendicular direction—in the plane of the conveyor belt 10—to the direction Y' and Z' a direction perpendicular to the plane of the conveyor belt 10.

The cameras 20 are arranged in predefined positions and are fixed (immobile) with respect to the conveyor belt 10.

These are in particular arranged above the conveyor belt 10 and have a field of view 21, for example in the shape of a pyramid, within which the objects 1 pass.

The cameras 20 are designed to capture three-dimensional images 22 of the objects 1 in transit from different directions (i.e. from several vantage points), within a predetermined measurement volume. The predetermined measurement volume is defined by the combination of the fields of view 21 (i.e. volumes of identification) of the different cameras 20.

Figure 2:
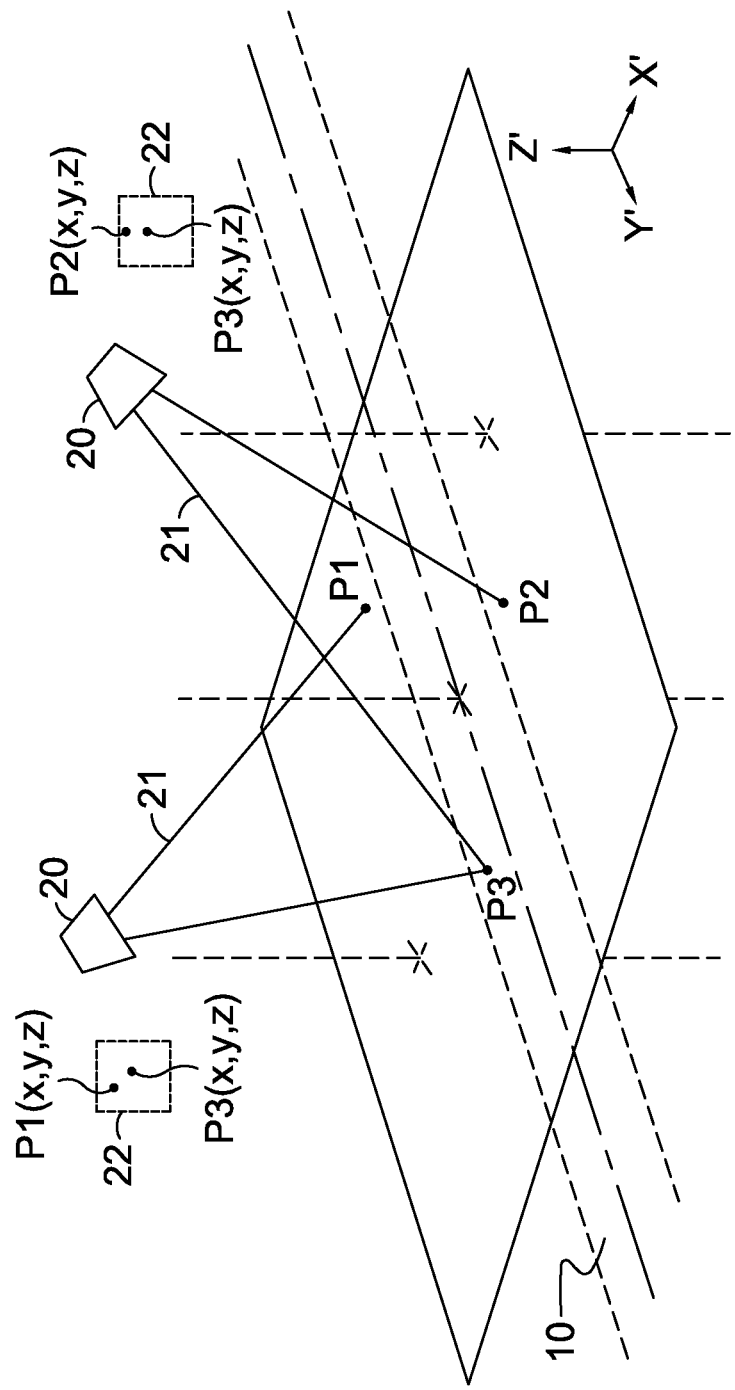
FIG. 2 schematically represents the operation of two 3D cameras of the system of FIG. 1.

The cameras 20 are configured in terms of quantity, positioning, field of view 21, depth of field and such, so as to guarantee the capture—within said predetermined measurement volume—of the entire volume of the objects 1 in transit upon the conveyor belt 10. In addition, they are configured to ensure a degree of overlap between the captured three-dimensional images 22 of the objects 1 in transit. This is schematically shown in FIG. 2, which shows a situation wherein the camera 20 on the left captures two points P1 and P3, the camera 20 on the right captures two points P2 and P3 and P3 is common to both. To each captured point (i.e. voxel) P1, P2, P3, the cameras 20 associate a set of X, Y, Z Cartesian coordinates, of a reference system of the cameras 20, together with a voxel intensity value (for example, provided as levels of gray or color). Alternatively or additionally, each point/voxel is associated with a pair of two-dimensional Cartesian coordinates X, Y, a value indicating the intensity of the voxel (for example, provided as levels of gray or color) and a value indicating the distance of the voxel with respect to a predetermined point of view. Preferably, during the installation of the reading system 100 a calibration procedure is performed that is designed to guarantee an X, Y, Z reference system that is common to all cameras 20.

Preferably, during the installation of the reading system 100 a further calibration procedure is performed that is designed to allow for the mapping of the Y, Y, Z coordinates of a point of an image from the reference system of said cameras 20 within the X', Y', Z' reference system of the system 100. This advantageously allows a user (for example an operator involved in controlling the objects 1 in transit within the system 100) to be provided with information regarding the actual dimensions and positions of the objects 1.

The cameras 20 are three-dimensional digital cameras. Preferably, they are designed to capture three-dimensional images 22 using range imaging technology. Preferably, the cameras 20 are stereo cameras, i.e. cameras with two lenses with a separate 2D sensor for each lens and designed to generate 3D images from the 2D images captured by the two 2D sensors.

The system 100 also comprises a processor 30 that is designed to receive the three-dimensional images 22 captured by the cameras 20 and to process them in order to identify the presence of any optical codes 3 upon the objects 1 and to decode the coded information 2 contained therein.

The processor 30 is designed to process the three-dimensional images 22 that have been captured simultaneously by the cameras 20. To this end, the capture of the three-dimensional images 22 by the different cameras 20 preferably occurs based upon external reference synchronization signals, designed to guarantee that the capture timing of the different cameras 20 are exactly the same. For example, the system 100 can be equipped with a synchronism system (not shown) provided with an input sensor positioned in proximity to the conveyor belt 10 upstream of the measurement volume of the cameras 20, with reference to the feed direction A. In this way, thanks to the input sensor, the processor 30 is able to detect the arrival of objects within the measurement volume and, on the basis of knowledge regarding the supply speed of the conveyor belt (it is known in advance whether this speed is constant or can be determined by the use of an encoder if this speed is not constant), to synchronize the repeated capture of sequences of images by the cameras 20 with the moment of entry of each object within the measurement volume.

In particular, according to one embodiment of the invention, the processor 30 is designed to perform the method of reading coded information 2 of the present invention on the two-dimensional images 22 received from the cameras 20, performing the steps of:
merging the three-dimensional images 22 in such a way as to obtain a single merged three-dimensional image 26 representing the object 1 in its entirety;
identifying planes 24 upon which faces 25 of the object 1 lie;
extracting, from the single merged three-dimensional image 26, two-dimensional images 27 that lie on the identified planes 24;
applying coded information recognition algorithms to at least part of the two-dimensional images 27 thus extracted.

Figure 3:
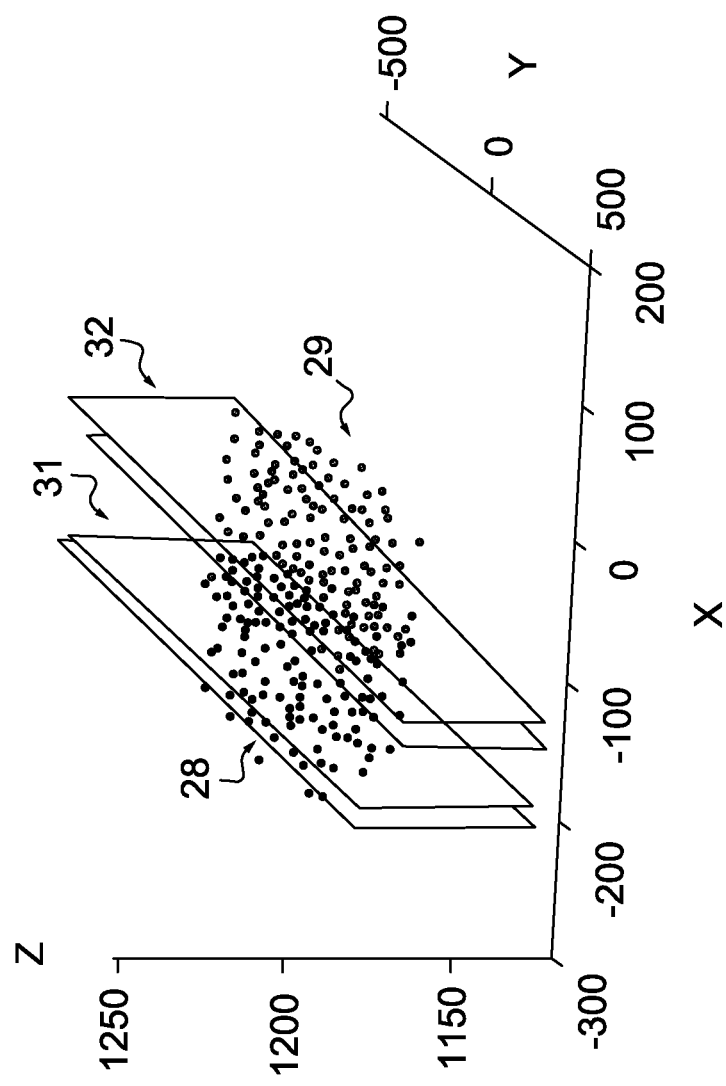
FIG. 3 schematically shows a merging step of two three-dimensional images.

In particular, according to a preferred embodiment and as schematically shown in FIG. 3, during the merging step, the three-dimensional images 22 captured by the cameras 20 are represent by respective three-dimensional point clouds 28, 29. Each point cloud is in turn represented—within the X, Y, Z reference system common to both cameras 20—by a respective stack 31, 32 of parallel planes ("plane-stack"), stacked along a predetermined direction (in the example of FIG. 3, along the X direction). It is noted that in FIG. 3 the unit of measurement along the three axes X, Y, Z of reference system of the cameras 20 is in units of length (typically cm or mm).

During the merging step, planes of the stacks 31, 32 are identified, which are shared by the two clouds 28, 29 and these shared planes are subjected to a data merging process. In particular, the points that lie on the shared planes are identified and for each of these points, a single voxel intensity value is generated, by appropriately combining the intensity values associated with such a point within the two clouds 28, 29. For example, the unique voxel intensity value could correspond to the average value of the intensity value associated with such a point within the two clouds 28, 29 or with the greatest intensity value.

It is noted that—in addition to or as an alternative to the three-dimensional point clouds 28, 29—the three-dimensional images 22 captured by the cameras 20 can be represented—as mentioned above—by respective pairs of 2D images: a 2D brightness image and a 2D depth image (or map). This representation is advantageous, for example, in the case of three-dimensional cameras 20 (such as stereo cameras) which are inherently designed to provide three-dimensional images in such a representation. In this case, instead of on the three-dimensional point clouds 28, 29 with respective stacks 31, 32 of parallel planes, the merging step can be performed by:
identifying, within the 2D depth images, those points having, in the X, Y plane, the same distance value, and
generating, for each of these, a single voxel intensity value, by appropriately combining the intensity values associated with such a point within respective 2D brightness images. For example, in a similar way to that described above, the unique voxel intensity value could correspond to the average value of the intensity value associated with such a point within the respective 2D brightness images or with the greatest intensity value.

Three-dimensional image merging techniques are known in the art, such as for example: Principal Component Analysis, Discrete Cosine Transform, Discrete Wavelet Transform, Intensity Hue Saturation, Contourlet Transform as described by Gazal Malhora et al. ("A review on various image fusion techniques", International Journal of Computer Engineering and Applications, Vol. VI, Issue III, June 14, www.ijcea.com ISBN 2321-3469, pages 49-59). Thanks to the merging step, the three-dimensional images 22 captured by the cameras 20 are merged into a single three-dimensional image 26 (shown in FIG. 4) representing the object 1 in its entirety.

Figure 4:
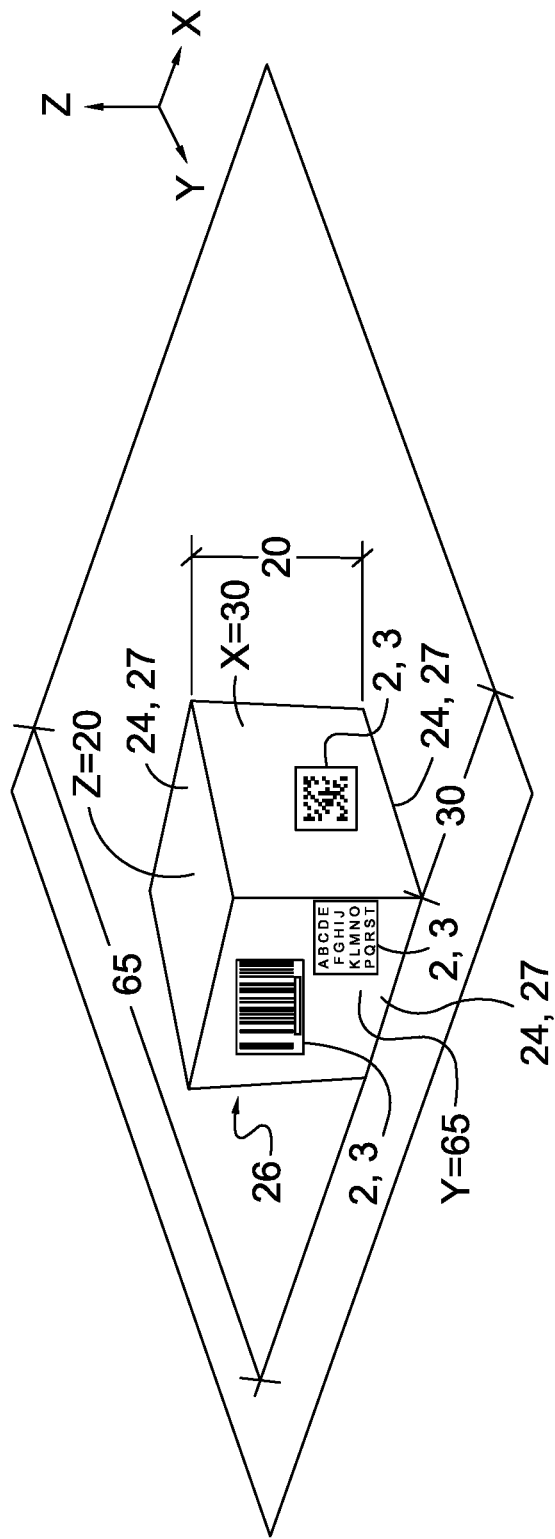
FIG. 4 schematically shows the result of a step of identifying planes upon which faces of an object lie and of a extraction step of two-dimensional images that lie on the identified planes.

With reference to FIG. 4, once such a merged three-dimensional image 26 is obtained, the processor 30 is designed to identify, on such an image, 2D planes 24 upon which the faces 25 of the object 1 lie.

The identification of the planes 24 can be performed by means of appropriate algorithms that are designed, for example, to apply appropriate geometric correlations to the cloud points representing said single merged three-dimensional image 26.

Techniques for the extraction of 2D planes from a 3D point cloud are known in the art, such as, for example, those described by Jann Poppinga et al. ("Fast Plane Detection and Polygonalization in noisy 3D Ranges Images", International Conference on Intelligent Robots and Systems (IROS), Nice, France, IEEE Press 2008), da M. Ying Yang et al. ("Plane Detection in Point Coud Data", TR-IGG-P-2010-01, Jan. 25, 2010, available at http://www.ipb.uni-bonn.de/uploads/txikgpublication/Plane_Detection_in_Point_Cloud_Data.pdf) as well as the methodology known as RANSAC ("random sample consensus").

It is noted that—in addition to or as an alternative to the three-dimensional point cloud—the single merged three-dimensional image 26 can by represented—as mentioned above—by a pair of 2D images: a 2D brightness image and a 2D depth image (or map). In this case, instead of on the three-dimensional point cloud, the step of identifying the planes 24 can be performed by applying appropriate geometrical correlations to the points of the depth image (or map), for example, by using one of the techniques mentioned above. This advantageously allows the computational efficiency of the step of identifying of the planes 24 to be improved. In fact, within the depth image, each point is associated with a single piece of three-dimensional information (the distance) while in the three-dimensional point cloud the three-dimensional information is given by three coordinates (X, Y, Z). The calculations necessary in the first instance in order to verify that a set of points belongs to a plane are therefore computationally lighter.

In a preferred embodiment, the identification of the 2D planes 24 is performed only with respect to those portions of said planes 24 corresponding to the faces 25 of the object. The result of this step is schematically shown in FIG. 4. Specifically, FIG. 4 shows three portions of three 2D planes 24 (which in the example have the equations Z=20, X=−30, and Y=65 cm) identified at three faces 25 of the object 1.

It is noted that although an embodiment has been described wherein the merging step is performed before the step of identifying the planes 24, as mentioned above, the processor 30 can also be configured such as to firstly perform the identification of the planes 24 and then the merging, or else to perform the two step substantially simultaneously, in a correlated manner.

Also, as mentioned above, the identification of the planes 24 can be appropriately limited to one face 25 or a subset of the faces 25 of the object 1. For example, the identification of the planes 24 can be performed by identifying only those planes (or portions of said planes) upon which the regions of interest of the object 1 lie (for example, regions comprising coded information or a part thereof). In this case, before performing the identification of the planes 24, the processor 30 is preferably designed to process the merged three-dimensional image 26 such as to identify such areas of interest. For example, the identification of the regions of interest can be performed by applying a technique known in the art (capable of detecting regions of interest from a 2D image) to the 2D brightness image obtained from the merged three-dimensional image 26. Examples of techniques designed to identify regions of interest from a 2D image are known, for example, from U.S. Pat. Nos. 6,047,893; 6,377,698 and 6,775,409, incorporated herein for reference.

This embodiment, limiting the identification of the 2D planes 24 to only those planes (or portions thereof) upon which lie the regions of interest, allows the computational efficiency to be improved, considering that generally those algorithms for identifying the planes are more complex than those for identifying the regions of interest.

In the illustrated embodiment (see in particular FIG. 5), the identification of the planes 24 is extended to all of the faces 25 of the object 1 (except the lower face, which is treated separately, as mentioned above, by means of the use of a linear or 2D camera placed beneath the conveyor belt 10).

Once the planes 24 upon which lie the faces 25 of the object 1 have been identified, the processor 30 is capable of extracting from the single merged three-dimensional image 26, obtained by means of the merging step, two-dimensional images 27 representing the faces 25 of the object 1. This is accomplished by identifying, from a three-dimensional point cloud, representing said single merged three-dimensional image 26, those points that lie on the identified planes 24. Alternatively, the points that lie on the planes 24 can be identified from the pair of 2D brightness images and 2D depth images obtained from the single merged three-dimensional image 26.

The processor 30 is at this point designed to apply the coded information recognition algorithms, designed to be applied to 2D images, to the two-dimensional images 27 thus obtained, representing the faces 25 of the object 1.

Figure 5:
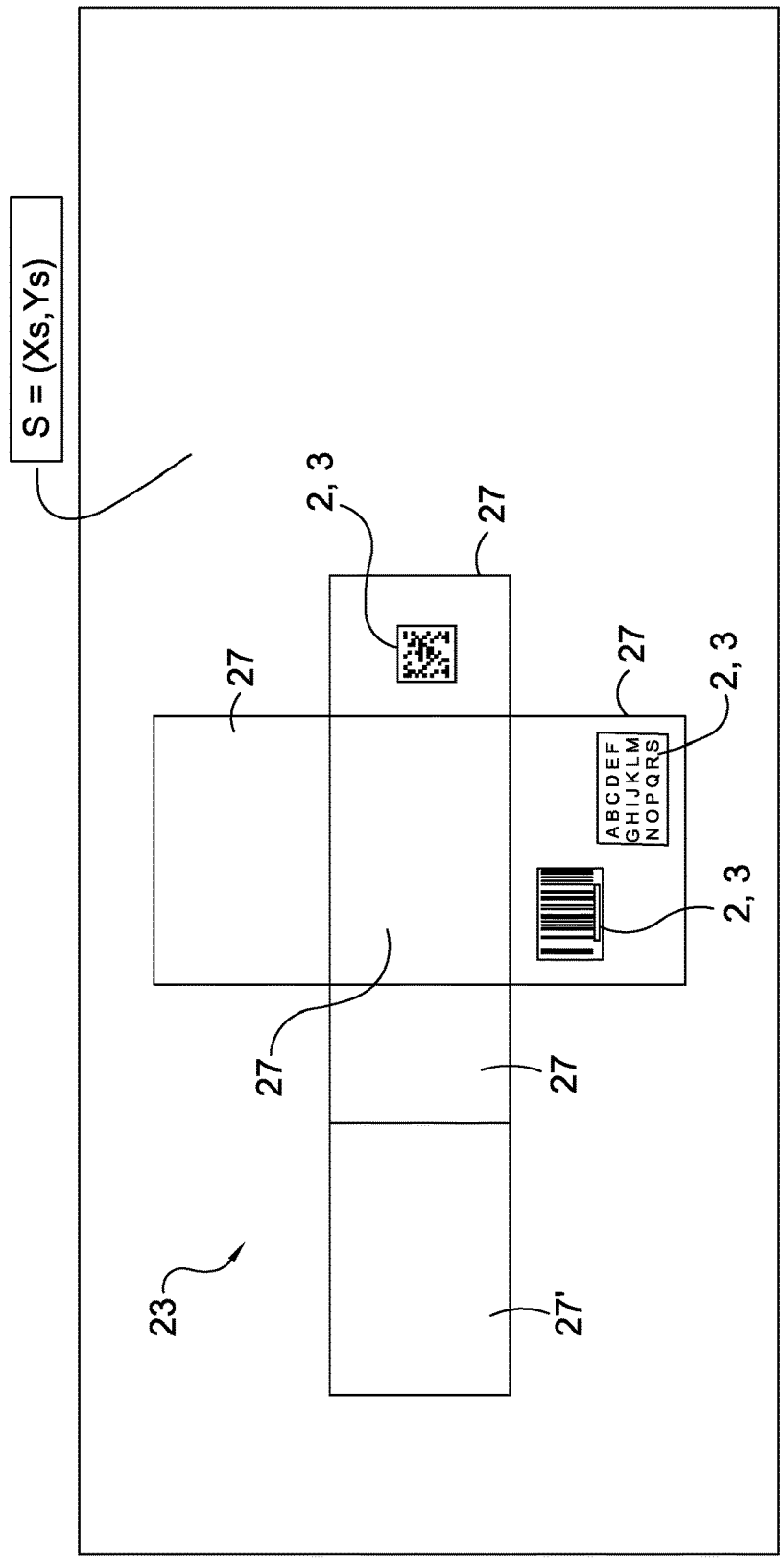
FIG. 5 schematically shows a single combined two-dimensional image, comprising a flattening of the object.

Alternatively or additionally, said two-dimensional images 27 extracted from the single merged three-dimensional image 26 can be deployed in an S plane having generic Cartesian coordinates Xs, Ys (unrelated to the coordinates X, Y, Z) in order to obtain, as schematically shown in FIG. 5, a single combined two-dimensional image 23, illustrating the flattening of the object 1 (or part of it). It is noted that in FIG. 5 the single combined two-dimensional image 23 also comprises the image 27' relating to the lower face of the object 1, which can be obtained—as mentioned above—from the 2D or linear camera placed beneath the conveyor belt 10.

In this embodiment, the processor 30 can apply the coded information recognition algorithms to the single combined two-dimensional image 23, illustrating the flattening of the object 1, rather than to each of the extracted two-dimensional images 27.

Depending upon the applications and requirements, the processor 30 can be designed to output (for example to a video screen) the single two-dimensional combined image 23, illustrating the flattening of the object 1, and/or the two-dimensional images 27 extracted from the single merged three-dimensional image 26, separately illustrating the faces 25 of the object 1.

In addition, depending upon the applications and requirements, the processor 30 can be designed to output (for example to a video screen) information regarding the shape and volume of the object 1, obtainable from the above mention flattening or directly from the above mentioned single merged three-dimensional image 26.

The single combined two-dimensional image 23, illustrating the flattening of the object 1, and/or the two-dimensional images 27 extracted from the single merged three-dimensional image, separately illustrating the faces 25 of the object 1, can be stored within a dedicated local or remote server (for example, in a "cloud"), not shown.

It is observed that whether dealing with a two-dimensional image 27 extracted from the single merged three-dimensional image 26, separately illustrating the faces 25 of the object 1, or the single combined two-dimensional image 23, illustrating the flattening of the object 1, the present invention advantageously allows for the generation (with regard to the application of the coded information recognition algorithms and for providing information to the user) of 2D images representing all of the faces 25 of interest of the object 1 without redundancy and without perspective distortion.

It is noted, furthermore, that the flattening of the object could be obtained, instead from the three-dimensional images, even starting from 2D images captured by means of linear or two-dimensional cameras and from volume information obtained by an additional special volume sensor. This would however require the use of suitable processing techniques for such 2D images and such volume information, designed to position the 2D images in space in order to form a 3D representation of the object and to make a correction to the perspective distortion caused by the use of linear or two-dimensional cameras.

It is noted that although an embodiment has been described wherein the three-dimensional images 22 provided by the cameras 20 are merged into a single merged three-dimensional image 26, in an alternative embodiment of the invention the merging step is omitted. In this case the steps of identifying the planes 24 upon which faces 25 of the object 1 lie and of extracting two-dimensional images 27 that lie on the identified planes 24 are individually performed, on each of the three-dimensional images 22 provided by the cameras 20. If, from the extraction process, there are found to be differing two-dimensional images 27 (provided by different three-dimensional images 22) but belonging to the same plane (i.e. to the same face 25 of the object 1), it will be possible—during the step of applying the coded information recognition algorithms—to perform appropriate "stitching" operations in order to rebuild for such a face 25 of the object 1, according to techniques known in the art, each optical code contained within such a face 25. Thanks to the fact that the two-dimensional images 27 represent faces 25 of interest of the object 1 without perspective distortion, the stitching operation can be performed accurately and precisely, without requiring the use of special techniques for processing such two-dimensional images and volume information in order to appropriately position the two-dimensional images in space such as to form a 3D representation of the object and to make a correction to the perspective distortion caused by the use of linear or two-dimensional cameras.

It is noted, furthermore, that although an embodiment has been described wherein the system 100 comprises a plurality of cameras 20, according to an alternative embodiment the system 100 can comprise only one of the cameras 20 described above. For the structural and functional characteristics of such a single camera 20, please refer, therefore, to that has been described above. Also, regarding, in general, the structural and functional characteristics of the system 100, please refer to the above except for the differences highlighted below. This embodiment with a single camera 20 can be used in cases wherein the presence of coded information is limited to a predetermined subset of the faces 25 of an object 1 (for example, 1, 2 or 3 predetermined faces) that are intended to be captured by such a camera. The latter is thereby configured in terms of positioning, field of view, depth of field and such so as to guarantee the capture—within said predetermined measurement volume—of said predetermined subset of the faces 25 of each object 1 in transit upon the conveyor belt 10.

The processor 30 is designed to receive the three-dimensional images 22 captured by the cameras 20 and to process them in order to identify the presence of any optical codes 3 upon the objects 1 and to decode the coded information 2 contained therein.

In particular, the processor 30 is designed to perform, on each three-dimensional image 22 captured by the camera 20, the steps of:

identifying planes 24 upon which faces 25 of the object 1 lie;

extracting two-dimensional images 27 that lie on the identified planes 24;

applying coded information recognition algorithms to at least part of the two-dimensional images 27 thus extracted In particular, according to a preferred embodiment schematically illustrated in FIG. 6, in block 60 the processor 30 is designed to receive the three-dimensional image 22 from the camera 20 and to process it in such a way as to obtain a 2D brightness image 70 and a 2D depth image 71, as described above and as shown by way of example in FIG. 6. In block 61 the processor 30 is designed to process each three-dimensional image 22 in such a way as to identify any areas of interest 72 of the object 1 (for example, a region comprising at least part of a piece of coded information, i.e. an optical code). For example, as mentioned above, the identification of regions of interest can be performed by applying to the 2D brightness image 70, obtained in block 60, a technique known in the art that is designed to identify regions of interest from a 2D image. In block 62 the processor 30 is designed to perform the step of identifying the planes 24 upon which faces 25 of the object 1 lie, but limited to those planes (in the example of FIG. 6, two planes) upon which lie the regions of interest 72 identified in block 61. The step of identifying the planes 24 is performed in the same way as explained above, preferably operating on the depth image 71 obtained in block 60. Once the planes 24, upon which the identified regions 72 lie, have been identified, in block 63 the processor 30 is designed to perform the step of extracting the two-dimensional images 27, comprising the regions of interest 72 of the object 1. This is performed by identifying the points that lie on the planes 24 identified from a three-dimensional point cloud representing the three-dimensional image 22 received as input in block 60 or from the pair of brightness image 70 and depth image 71 obtained in block 60. In block 64 the processor 30 is at this point designed to apply the coded information recognition algorithms (configured to be applied to 2D images) to the two-dimensional images 27 obtained in block 63, comprising the regions of interest 72 of the object 1. Preferably, in block 65 the processor 30 is also designed to implement special "stitching" algorithms designed to reconstruct an optical code from two different regions of interest 72 (and thus resulting in two different two-dimensional images 27) but belonging to a same plane (i.e. belonging to the same face 25 of the object 1).

Figure 6:
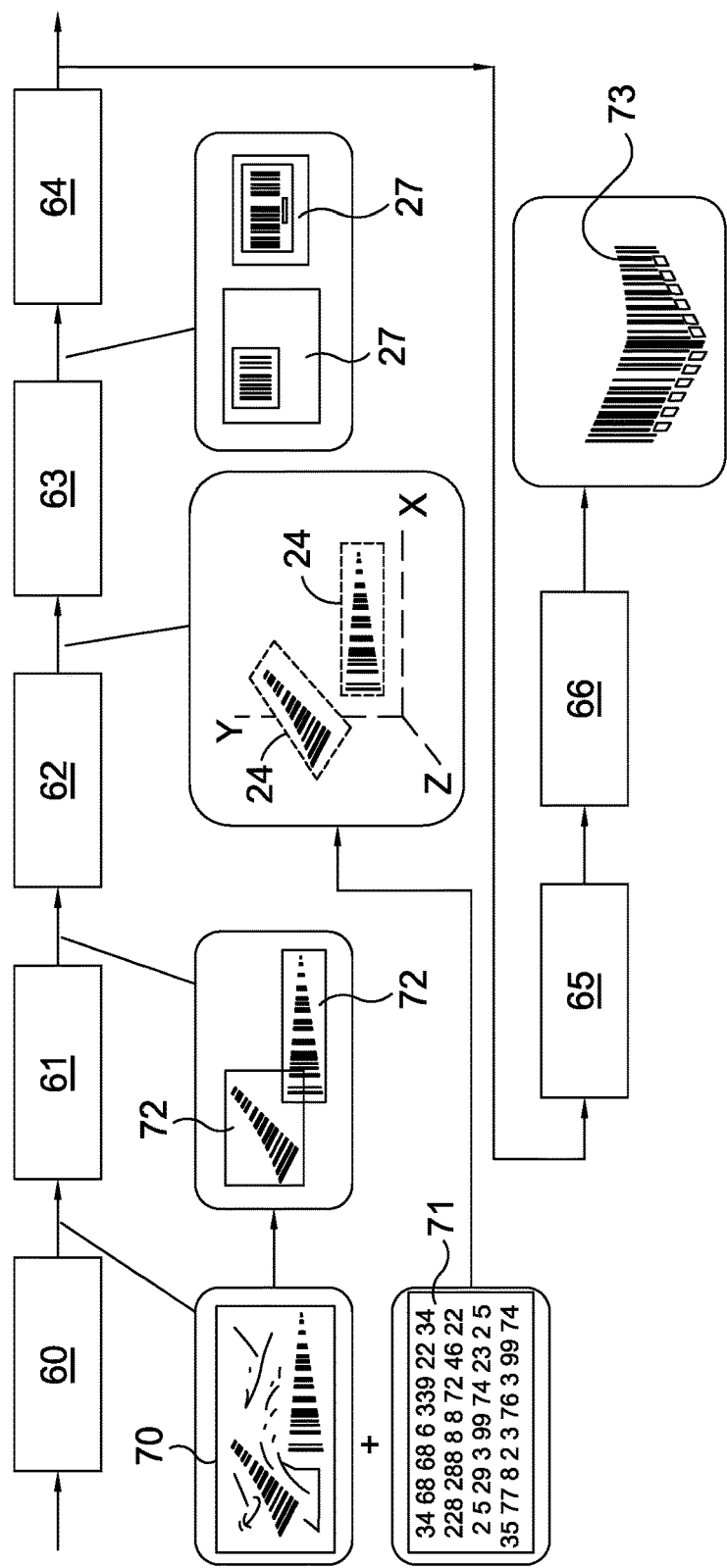
FIG. 6 schematically illustrates the function of a coded information reading system according to one embodiment of the present invention.

Finally, depending upon the applications and requirements in the same way as described above, in block 66 the processor 30 is preferably designed to output (for example to a video screen) the two-dimensional images 27 obtained in block 63, separately illustrating the individual identified regions of interest 72 or, as for example shown in FIG. 6, a three-dimensional representation 73 of part of the object 1, with portions of the faces 25 comprising the regions of interest 72 highlighted.

The invention claimed is:

1. A system for reading coded information from an object, comprising:
    a plurality of three-dimensional cameras configured to capture three-dimensional images of the object within a measurement volume defined by a combination of different fields of view for each of the three-dimensional cameras such that the three-dimensional cameras are calibrated to have an X, Y, Z coordinate system that is common to each three-dimensional camera; and
    a processor configured to process each three-dimensional image captured by the three-dimensional cameras in order to:
        merge data from each of the three-dimensional cameras;
        identify planes upon which faces of the object lie;
        extract two-dimensional images that lie on the identified planes; and
        apply coded information recognition algorithms to at least part of the extracted two-dimensional images,
    wherein merging the data includes at least one of merging the images captured by the plurality of three-dimensional cameras prior to identifying the planes and extraction to obtain a single merged three-dimensional image representing the object in its entirety for further identification of planes or extraction, or merging at least part of the extracted two-dimensional images into a single combined two-dimensional image.

2. The system according to claim 1, wherein each of the three-dimensional cameras uses range imaging technology.

3. The system according to claim 1, wherein each of the three-dimensional cameras is selected from the group comprising stereo cameras, TOF cameras, structured light cameras, and plenoptic cameras.

4. The system according to claim 1, wherein the processor is configured to merge the at least part of the extracted two-dimensional images into a single combined two-dimensional image, comprising a flattening of the at least part of the extracted two-dimensional images.

5. The system according to claim 4, wherein the processor is configured to apply the coded information recognition algorithms to the single combined two-dimensional image.

6. The system according to claim 4, wherein the processor is configured to separately apply the coded information recognition algorithms to each of the at least part of the extracted two-dimensional images.

7. The system according to claim 1, wherein the processor is configured to process each three-dimensional image captured by each three-dimensional camera in order to identify any areas of interest of the object.

8. The system according to claim 7, wherein the identification of planes upon which faces of the object lie is performed only for the plane upon which lies the identified region of interest or a portion of the plane upon which lies the identified region of interest.

9. The system according to claim 1, wherein the processor is designed to merge the images captured by the plurality of three-dimensional cameras to obtain a single merged three-dimensional image representing the object in its entirety.

10. The system according to claim 9, wherein the three-dimensional images captured by the plurality of cameras are represented by their respective three-dimensional point clouds and the processor is configured to merge the three-dimensional images:
    representing the point clouds with respective stacks of parallel planes, stacked along a predetermined direction;
    identifying shared planes from the stacks of parallel planes; and
    performing a data merging algorithm on the points of the point clouds that belong to the identified shared planes.

11. The system according to claim 9, wherein the extraction of two-dimensional images is performed from the single merged three-dimensional image.

12. The system according to the claim 9, wherein the identification of the planes upon which faces of the object lie is performed on the single merged three-dimensional image.

13. The system according to claim 9, wherein the processor is configured to firstly perform the merging of the three-dimensional images captured by the plurality of three-dimensional cameras and then the identification of the planes upon which faces of the object lie or, vice versa, firstly the identification of the planes and then the merging of the three-dimensional images or else to perform the two steps substantially simultaneously.

14. The system according to claim 9, wherein the processor is configured to perform the identification of the regions of interest of the object processing the three-dimensional images captured by the plurality of three-dimensional cameras or the single merged three-dimensional image.

15. The system according to claim 1, wherein the object is moving with respect to the three-dimensional cameras.

16. The system according to claim 15, comprising a conveyor belt for transporting the object with respect to the three-dimensional cameras located in a fixed position.

17. A method for reading coded information from an object, the method comprising:
    capturing, with a plurality of three-dimensional cameras, three-dimensional images of the object within a measurement volume defined by a combination of different fields of view for each of the three-dimensional cameras such that the three-dimensional cameras are calibrated to have an X, Y, Z coordinate system that is common to each three-dimensional camera; and
    processing each three-dimensional image captured including:
        merging data from each of the three-dimensional cameras;
        identifying planes upon which faces of the object lie;
        extracting two-dimensional images that lie on the identified planes; and
        applying coded information recognition algorithms to at least part of the extracted two-dimensional images,
    wherein merging the data includes at least one of merging the images captured by the plurality of three-dimensional cameras prior to identifying the planes and extraction to obtain a single merged three-dimensional image representing the object in its entirety for further identification of planes or extraction, or merging at least part of the extracted two-dimensional images into a single combined two-dimensional image.

18. The method of claim 17, wherein merging the data includes stitching the data from multiple three-dimensional cameras.

19. The method of claim 17, further comprising flattening the single merged three-dimensional image prior to applying the coded information recognition algorithms.

20. The method of claim 17, further comprising flattening the single combined two dimensional image prior to applying the coded information recognition algorithms.

\* \* \* \* \*